US012690719B2

(12) United States Patent
Pamplin

(10) Patent No.: US 12,690,719 B2
(45) Date of Patent: **\*Jul. 28, 2026**

(54) BLENDER WITH BUILT-IN DISPLAY PANEL

(71) Applicant: MavorCo Operations LLC, New York, NY (US)

(72) Inventor: Ryan Michael Pamplin, San Juan, PR (US)

(73) Assignee: MavorCo Operations LLC, New York, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/081,784

(22) Filed: Mar. 17, 2025

(65) Prior Publication Data

US 2025/0213072 A1 Jul. 3, 2025

Related U.S. Application Data

(63) Continuation of application No. 18/621,675, filed on Mar. 29, 2024, now Pat. No. 12,268,334, which is a continuation of application No. 18/187,420, filed on Mar. 21, 2023, now Pat. No. 12,022,980, which is a continuation of application No. 17/390,094, filed on Jul. 30, 2021, now Pat. No. 11,659,958.

(51) Int. Cl.
*A47J 43/07* (2006.01)
*G06F 3/041* (2006.01)

(52) U.S. Cl.
CPC ........ *A47J 43/0716* (2013.01); *G06F 3/0416* (2013.01)

(58) Field of Classification Search
CPC .......................... A47J 43/0716; G06F 3/0416
See application file for complete search history.

(56) References Cited

U.S. PATENT DOCUMENTS

| | | | |
|---|---|---|---|
| 10,328,402 B2 | 6/2019 | Kolar | |
| 10,828,612 B1 | 11/2020 | Pamplin | |
| 10,987,643 B1 * | 4/2021 | Wallace | ................ A47J 43/046 |

(Continued)

FOREIGN PATENT DOCUMENTS

| | | |
|---|---|---|
| CN | 106580130 A | 4/2017 |
| CN | 112386134 A | 2/2021 |

(Continued)

OTHER PUBLICATIONS

Anonymous: "3 Ways to Disable Haptic Feedback on Android—wikiHow Tech", Jul. 14, 2015 (Jul. 14, 2015), pp. 1-2, XP093246433, wikihow.tech Retrieved from the Internet: URL:https://www.wikihow.tech/Disable-Hapti c-Feedback-on-Android [retrieved on Feb. 4, 2025].

(Continued)

*Primary Examiner* — Ryan A Lubit
(74) *Attorney, Agent, or Firm* — Esplin & Associates, PC

(57) ABSTRACT

A blender with a display panel is provided to effectuate presentations of visual content. Exemplary implementations may: receive a first type of user input through the control interface; make detections regarding the user input received through the control interface; effectuate presentation of visual content on the display panel, responsive to a first detection of the first type of detections; and/or perform other operations.

20 Claims, 6 Drawing Sheets

(56) References Cited

U.S. PATENT DOCUMENTS

| | | | | |
|---|---|---|---|---|
| 11,659,958 | B1 * | 5/2023 | Pamplin | G06F 3/0416 |
| | | | | 366/132 |
| 12,022,980 | B2 * | 7/2024 | Pamplin | A47J 36/32 |
| 12,268,334 | B2 * | 4/2025 | Pamplin | G06F 3/0416 |
| 2014/0149239 | A1 * | 5/2014 | Argue | G06Q 30/0631 |
| | | | | 705/21 |
| 2016/0331179 | A1 * | 11/2016 | Koether | A47J 37/1266 |
| 2017/0224169 | A1 * | 8/2017 | Kolar | A47J 43/0777 |
| 2018/0070760 | A1 * | 3/2018 | Herbert | A47J 31/405 |
| 2018/0161741 | A1 | 6/2018 | Sedlacek | |
| 2020/0035866 | A1 * | 1/2020 | Lee | G09G 3/32 |
| 2020/0219606 | A1 * | 7/2020 | Koh | G06Q 30/0631 |
| 2020/0275807 | A1 * | 9/2020 | Kolar | A47J 43/046 |
| 2020/0375402 | A1 * | 12/2020 | Krivos | A47J 43/085 |

FOREIGN PATENT DOCUMENTS

| | | | |
|---|---|---|---|
| DE | 102008032453 | A1 | 1/2010 |
| EP | 2708170 | A1 | 3/2014 |

OTHER PUBLICATIONS

Espacenet translation of Yu, Ju-lin (CN106580130A), 4 pages, published Apr. 26, 2017 (Year: 2017).
PE2E Search Machine translation of Wilhelm Maerz (DE102008032453A1), published Jan. 14, 2010 (Year: 1020).

* cited by examiner

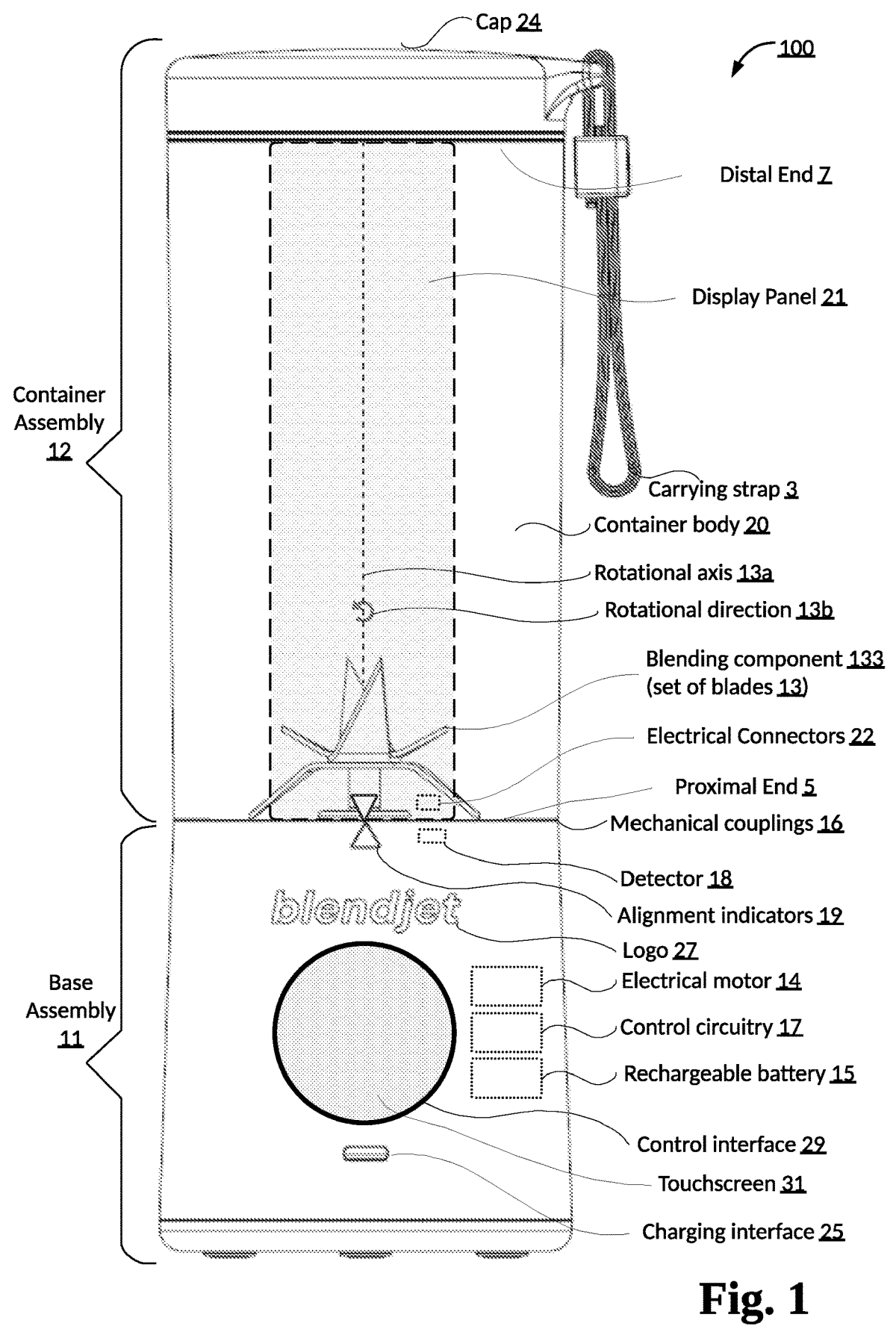

Cap 24

100

Distal End 7

Display Panel 21

Container
Assembly
12

Carrying strap 3

Container body 20

Rotational axis 13a

Rotational direction 13b

Blending component 133
(set of blades 13)

Electrical Connectors 22

Proximal End 5

Mechanical couplings 16

Detector 18

Alignment indicators 19

Logo 27

Electrical motor 14

Control circuitry 17 blendjet

Base
Assembly
11

Rechargeable battery 15

Control interface 29

Touchscreen 31

Charging interface 25

Fig. 1

BLENDER WITH BUILT-IN DISPLAY PANEL

FIELD OF THE DISCLOSURE

The present disclosure relates to blenders with built-in display panels, particularly portable blenders with transparent display panels.

BACKGROUND

Blenders are known, typically as consumer-grade home appliances. Transparent display panels or see-through display are known, e.g., for personal computing devices, window displays, virtual reality devices, and augmented reality devices.

SUMMARY

One aspect of the present disclosure relates to a blender configured to blend foodstuffs using different (blending) modes of operation. A user may control transitions between different modes of operation through a user interface, (e.g., a touchscreen interface). The user may control presentations of visual content on a display panel through the touchscreen interface. The display panel may be embedded in a container body of the blender and may be transparent, such that foodstuffs held within the container body are visible through the display panel. In some implementations, the blender may be portable due to its size, and/or its rechargeability. By virtue of true portability, a user can take the blender anywhere and create drinks, shakes, smoothies, baby food, sauces, and/or other concoctions. Once the blender is fully charged, a user can prepare multiple servings quickly and easily. In some implementations, lack of an external power source, much less a reliable external power source, is no longer preventing users from enjoying blended drinks. By virtue of the control interface and corresponding control circuitry described in this disclosure, different blending modes of operation may be available through an easy-to-use control interface. In some implementations, the control interface may include a (round) touchscreen that is configured to receive user input. In other implementations, the control interface may include a button that the user can push.

The blender may include a blending component, a base assembly, a container assembly, a control interface, control circuitry, and/or other components. As used herein, the term "foodstuffs" may include ingredients ranging from solid to liquid, from hot to cold or frozen, in any combination. As used herein, the term "ingredient" merely connotates something fit to ingest, and not necessarily nutritional value. For example, ice and/or ice cubes may be ingredients.

As used herein, any association (or relation, or reflection, or indication, or correspondency) involving assemblies, blending components, blades, motors, rotational axes, longitudinal axes, diameters, batteries, couplings, interfaces, display panels, touchscreens, detectors, indicators, magnetic components, caps, rotations, and/or another entity or object that interacts with any part of the blender and/or plays a part in the operation of the blender, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 shows a front view of a blender configured to blend foodstuffs using different (blending) modes of operation, in accordance with one or more implementations.

DETAILED DESCRIPTION

Figure 2:
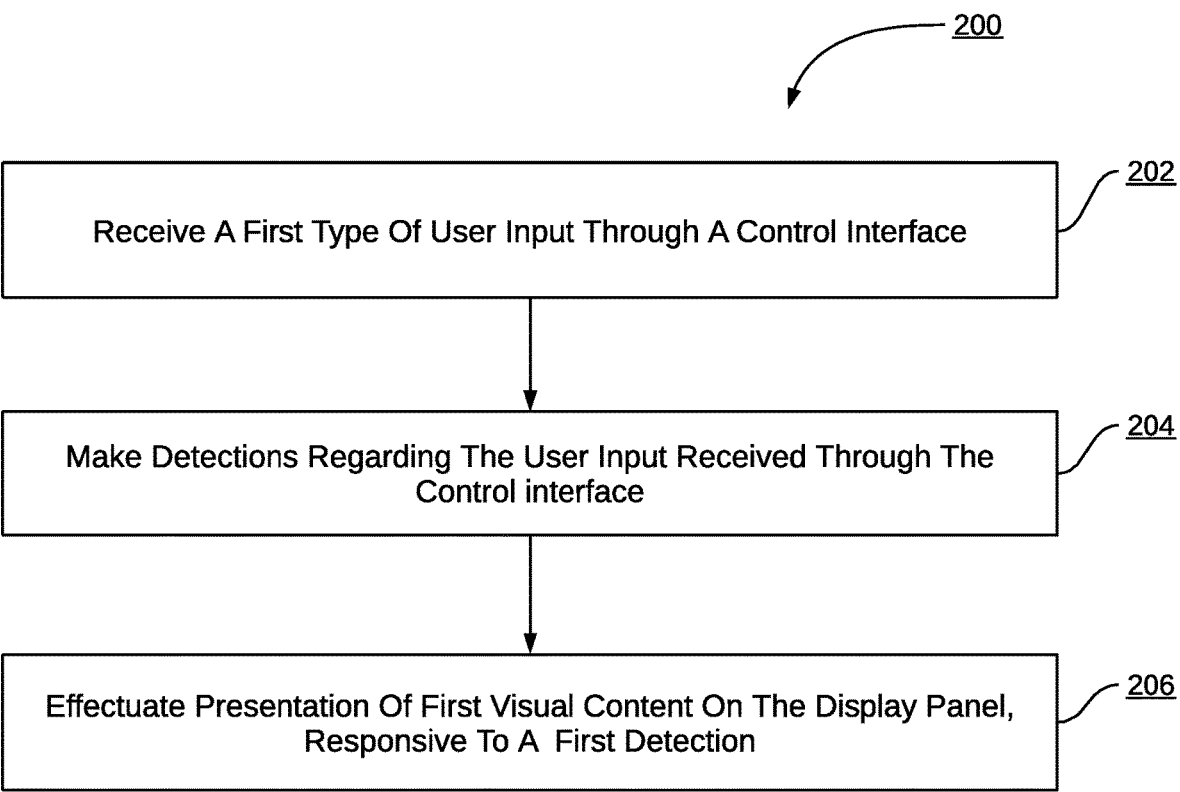
FIG. 2 shows a method for effectuating presentations of visual content on a display panel of a blender, in accordance with one or more implementations.

FIG. 1 shows a blender 100 configured to blend foodstuffs using different blending modes of operation, in accordance with one or more implementations. Blender 100 may include one or more of a base assembly 11, a container assembly 12, a blending component 133, a control interface 29, control circuitry 17 (depicted in FIG. 1 as a dotted rectangle to indicate this component may be embedded within base assembly 11, and not readily visible from the outside), and/or other components. Control interface 29 may include one or more of a touchscreen 31, a button (not depicted), and/or other components. Container assembly 12 may include one or more of a container body 20, a display panel 21 (depicted in FIG. 1 as a dotted rectangle to indicate this component may be embedded within container body 20) and/or other components. Base assembly 11 and container assembly 12 may be configured to be coupled during blending by blender 100. For example, in some implementations, base assembly 11 and container assembly 12 may be mechanically coupled, e.g., through one or more threaded couplings. Other types of couplings may be envisioned for blender 100, though leak-proof options are preferred, since most uses include one or more liquid ingredients. In some implementations, display panel 21 may include one or more electrical connectors 22 (depicted in FIG. 1 as a dotted rectangle to indicate this component may be embedded in display panel 21, and not readily visible from the outside). Electrical connectors 22 may be located at the base of display panel 21, near base assembly 11. Electrical connectors 22 may be configured to couple with one or more components of base assembly 11 (e.g., electrical motor 14, control circuitry 17, and/or other components). Responsive to being coupled with base assembly 11, electrical connectors 22 may be configured to transmit power and/or information (e.g., visual content) to display panel 21. In some implementations, control circuitry 17 and/or other components may be included in base assembly 11, e.g., within base assembly 11. For example, one or more of control interface 29, control circuitry 17, electrical motor 14 (depicted in FIG. 1 as a dotted rectangle to indicate this component may be embedded within base assembly 11, and not readily visible from the outside), rechargeable battery 15 (depicted in FIG. 1 as a dotted rectangle to indicate this component may be embedded within base assembly 11, and not readily visible from the outside), and/or other components may be integrated permanently into base assembly 11 such that base assembly 11 forms an integral whole. In some implementations, the phrase "integrated permanently" may refer to components being integrated such that they are not readily accessible, serviceable, and/or replaceable by a user, or at least not during ordinary usage by the user, including, but not limited to, charging, blending, cleaning, and storing for later use.

Figure 4:
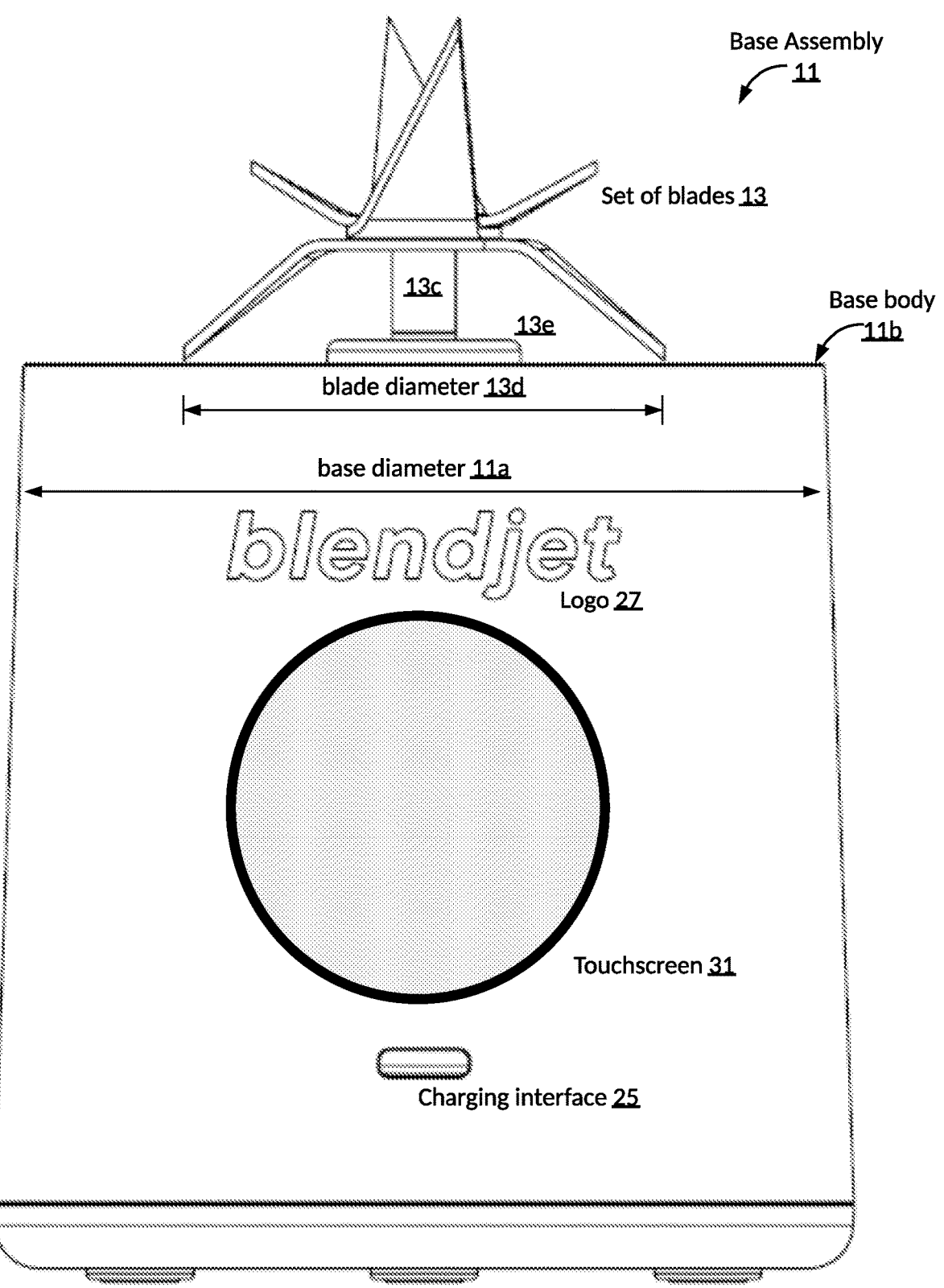
FIG. 4 shows a front view of a base assembly of a blender configured to blend foodstuffs using different (blending) modes of operation, in accordance with one or more implementations.

In some implementations, base assembly 11 may include one or more of a base body 11b (as depicted in FIG. 4, containing at least some of the components of base assembly 11), blending component 133 (e.g., a set of blades 13, also referred to as a set of one or more blades 13), electrical motor 14, a rechargeable battery 15, a charging interface 25, one or more mechanical couplings 16, a detector 18 (depicted in FIG. 1 as a dotted rectangle to indicate this component may be embedded within base assembly 11, and not readily visible from the outside), one or more alignment indicators 19, control interface 29, and/or other components.

In some implementations, one or more mechanical couplings 16 may include threaded couplings. For example, one or more mechanical couplings 16 may include a first mechanical coupling and a second mechanical coupling. In some implementations, the first mechanical coupling may be included in base assembly 11, and may be a female threaded coupling configured to fit together with the second mechanical coupling (which may be included in container assembly 12). The first mechanical coupling and the second mechanical coupling may be configured to (temporarily and detachably) couple base assembly 11 to container assembly 12.

Referring to FIG. 1, blending component 133 may include one or more structural components configured to blend foodstuffs, including but not limited to one or more blending bars, one or more blades, and/or other structural components configured to rotate. For example, in some implementations, blending component 133 may include set of blades 13, which may be rotatably mounted to base assembly 11 to blend foodstuffs. Blending component 133 may be configured to rotate around a rotational axis 13a. Rotational axis 13a is depicted in FIG. 1 as a geometric 2-dimensional line extending indefinitely through blending component 133, and is not a physical axis. Rather, rotational axis 13a indicates how blending component 133 rotates in relation to other components of blender 100, in a rotational direction 13b. In some implementations, blending component 133 may be mounted permanently to base assembly 11. In some implementations, set of blades 13 may include 1, 2, 3, 4, 5, or more pairs of blades. In some implementations, a pair of blades may include two blades on opposite sides of rotational axis 13a. In some implementations, a pair of blades may have two blades such that the distal ends of these two blades are at the same horizontal level. In some implementations, as depicted in the upright configuration of blender 100 in FIG. 1, set of blades 13 may include six blades that form three pairs of blades. In some implementations, set of blades 13 may include at least two downward blades, which may prevent and/or reduce foodstuffs remaining unblended when disposed under the upward blades. In some implementations, set of blades 13 may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations having limited power (here, the term "limited" is used in comparison to blenders that are connected to common outlets during blending), such as disclosed herein. As used herein, directional terms such as upward, downward, left, right, front, back, and so forth are relative to FIG. 1 unless otherwise noted.

Referring to FIG. 1, in some implementations, base assembly 11 may have a cylindrical and/or conical shape (apart from blending component 133 and/or set of blades 13). In some implementations, the shape of base assembly 11 may have a base diameter between 2 and 4 inches. In some implementations, the shape of base assembly 11 may have a base diameter between 3 and 3.5 inches. Such a base diameter may improve portability, as well as allow blender 100 to be stored in a cup holder, e.g., in a vehicle. For example, FIG. 4 shows a front view of base assembly 11, depicting a blade diameter 13d (e.g., the diameter of the circle described by rotation of the distal ends of the lowest (and/or widest) pair of blades in set of blades 13) and a base diameter 11a (as measured at or near the top of base assembly 11). In some implementations, blade diameter 13d may refer to the largest diameter of any circle described by rotation of distal ends of pairs of blades in set of blades 13 (or other distal ends of blending component 133), as measured perpendicular to rotation. In some implementations, the orientation of blade diameter 13d may be orthogonal/perpendicular to the direction of rotational axis 13a. In some implementations, the plane of rotation of the distal ends of the blades (or other distal ends of blending component 133) that define blade diameter 13d may be orthogonal/perpendicular to the direction of rotational axis 13a. Blade diameter 13d may refer to a blending bar, or to set of blades 13, and/or to other types of blending components.

Referring to FIG. 1, touchscreen 31 may be curved to match the cylindrical and/or conical shape of base assembly 11. In some implementations, touchscreen 31 may sit flush on base assembly 11. In some implementations, touchscreen 31 may include one or more of a lens, a glass top, an optical element, and/or other components. In some implementations, touchscreen 31 may be flat (i.e., level) and include a curved (topical) lens. The lens may be curved to match the cylindrical and/or conical shape of base assembly 11. The lens may be positioned on top of touchscreen 31 and/or may give the appearance that touchscreen 31 is curved. In some implementations, touchscreen 31 may protrude out from base assembly 11, such that the edge of touchscreen 31 creates a lip with base assembly 11. In some implementations, the lip of touchscreen 31 may have a height of 1 millimeters, 2 millimeters, 3 millimeters, and/or other measurements. In some implementations, the lip may surround the circumference of touchscreen 31.

Figure 3:
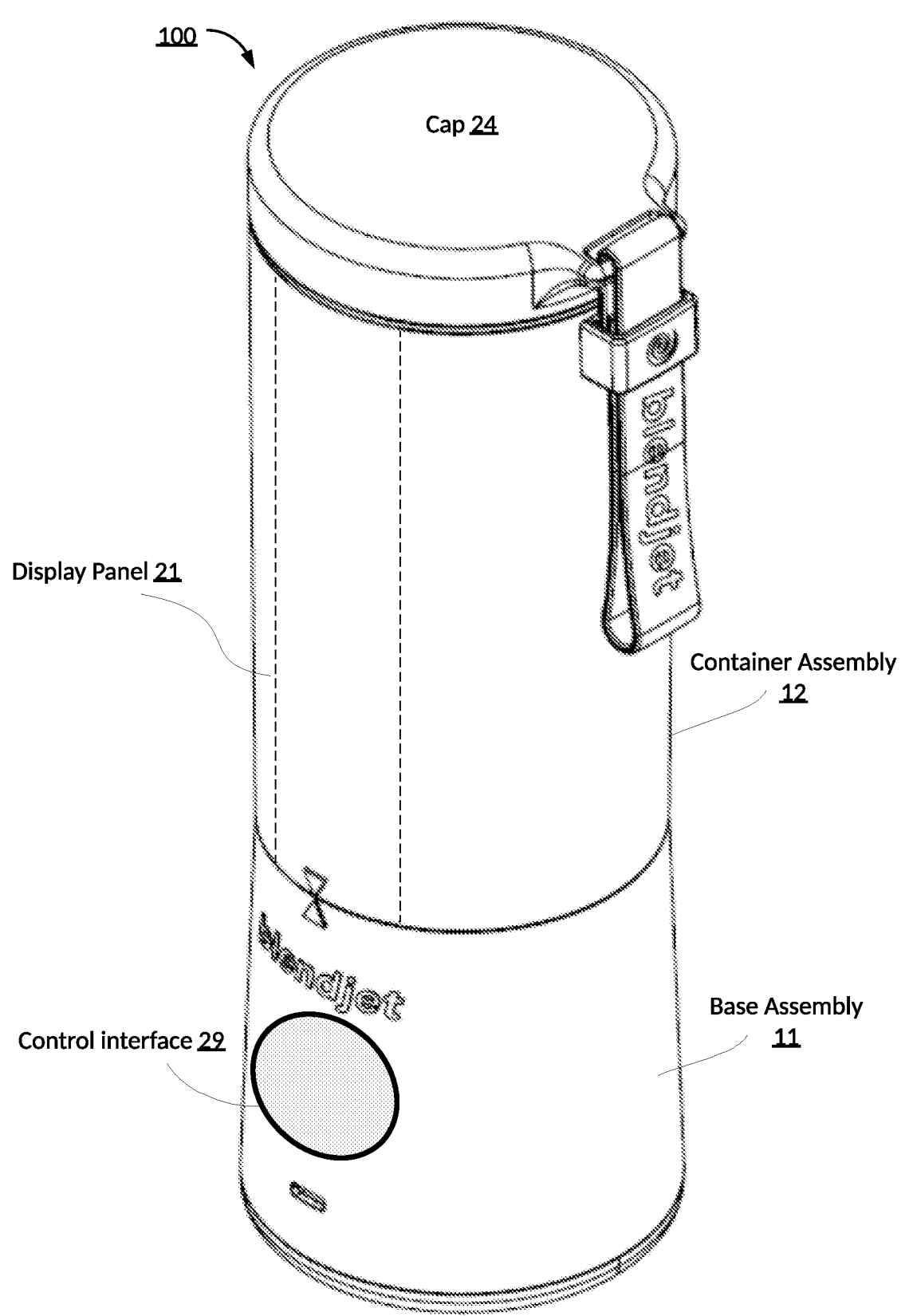
FIG. 3 shows an isometric elevated view of a blender configured to blend foodstuffs using different (blending) modes of operation, in accordance with one or more implementations.

Referring to FIG. 1, container assembly 12 may include one or more of a container body 20, a cap 24 (e.g., to prevent spilling during blending), a carrying strap 3 (e.g., configured to carry blender 100), and/or other components. Container body 20 may form a vessel to hold and/or contain foodstuffs within container assembly 12. In some implementations, container body 20 may be a cylindrical body and/or have a cylindrical shape, as depicted in FIG. 3, by way of non-limiting example. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces. In some implementations, container assembly 12 and/or container body 20 may have cylindrical shapes. In some implementations, container assembly 12 and/or container body 20 may have a proximal end 5 and a distal end 7. In some implementations, proximal end 5 may be disposed, subsequent to base assembly 11 being coupled to container assembly 12, near blending component 133 and/or set of blades 13. Distal end 7 may be opposite proximal end 5. In some implementations, distal end 7 may include cap 24. Container assembly 12 and/or container body 20, may have a container height that extends from proximal end 5 to distal end 7. In some implementations, the container height may range between 4 and 6 inches, between 5 and 7 inches, between 6 and 8 inches, between 7 and 10 inches, and/or another distance.

Referring to FIG. 1, display panel 21 may be embedded within container body 20. In some implementations, display panel 21 may be embedded within container body 20 such that the external surface of container body 20 is smooth. In some implementations, display panel 21 may be embedded within container body such that the edges of display panel 21 creates a lip with container body 20. The lip of display panel 21 may have a height of 1 millimeters, 2 millimeters, 3 millimeters, and/or other measurements. Display panel 21 may have a shape that follows the curvature of container assembly 12 and/or container body 20, as depicted in FIG. 3. Display panel 21 may have a panel height that extends from a first point or level along the container height to a second point or level along the container height. In some implementations, the first point or level is at or near proximal end 5. In some implementations, the second point or level is at or near distal end 7. In some implementations, the panel height may be at least 40% of the container height. In some implementations, the panel height may be at least 50% of the container height. In some implementations, the panel height may be about 75%% of the container height. In some implementations, the panel height may be between 60%-80% of the container height. In some implementations, the panel height may be between 75%-100% of the container height. In some implementations, the panel height may be the same as or similar to the container height. In some implementations, the panel height may be one half, three-quarters, seven-eighths, and/or other fraction of the container height. Display panel 21 may have a panel width that extends from a first point along a circumference of container body 20 to a second point along the circumference of container body 20. The panel width may be one or more of 0.5 inches, 1 inch, 1.5 inches, 2 inches, 5 centimeters, 10 centimeters, and/or other widths. In some implementations, display panel 21 may extend around the entire circumference of container body 20.

Referring to FIG. 1, display panel 21 may be configured to present visual content. Display panel 21 may be an LCD screen, an LED screen, an OLED screen, and/or other types of transparent (or see-through) displays. In some implementations, display panel 21 may be transparent during presentations of visual content so that foodstuffs held in container assembly 12 may be visible through container body 20 and/or display panel 21. In some implementations, display panel 21 may be completely transparent (i.e., clear) or partially transparent (i.e., frosted), responsive to display panel 21 not presenting visual content. Display panel 21 may have a frosted appearance when blender 100 is turned off or in an idle mode, such that display panel 21 is distinguishable on container body 20, as shown in FIG. 1. In some implementations, display panel 21 may be opaque and/or otherwise non-transparent. In some implementations, mechanical couplings 16 must be engaged and/or aligned to allow presentations of visual content on display panel 21.

Referring to FIG. 1, electrical motor 14 may be configured to rotationally drive blending component 133. In some implementations, electrical motor 14 may operate at a voltage between 5V and 15V. In one or more preferential implementations, electrical motor 14 may operate at a voltage of about 7.4V. In some implementations, electrical motor 14 may be configured to spin blending component 133 at a maximum speed between 15,000 rotations per minute (RPM) and 40,000 RPM. In one or more preferential implementations, electrical motor 14 may spin blending component 133 at a maximum speed of about 22,000 RPM. Electrical motor may be configured to be powered by rechargeable battery 15. Simultaneously, in some implementations, electrical motor 14 may be further configured to be powered through (standardized) charging interface 25, though that may not be the preferred way of operating blender 100. In one or more preferential implementations, no power is (or need be) supplied to electrical motor 14 from an external power source during blending by blender 100. In some implementations, control circuit 17 may be configured to control electrical motor 14 during rotation of blending component 133. For example, control circuit 17 may control the speed of the rotation of blending component 133 during blending by blender 100.

Referring to FIG. 1, rechargeable battery 15 may be configured to power electrical motor 14, display panel 21, and/or other components of blender 100. In some implementations, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable (in other words, non-removable). In some implementations, rechargeable battery 15 may be user-replaceable. In some implementations, rechargeable battery 15 may be store-bought. In some implementations, rechargeable battery 15 may have a capacity between 1000 mAh and 10000 mAh. In one or more preferential implementations, rechargeable battery 15 may have a capacity of about 2500 mAh. In some implementations, control circuit 17 may be configured to control charging of rechargeable battery 15. For example, control circuit 17 may control the transfer of electrical power through standardized charging interface 25 into rechargeable battery 15. For example, responsive to a detection that rechargeable battery 15 is fully charged, control circuit 17 may prevent the transfer of electrical power through standardized charging interface 25 into rechargeable battery 15.

Charging interface 25 may be standardized and may be configured to conduct electrical power to rechargeable battery 15. In some implementations, charging interface 25 may be configured to conduct electrical power to charge rechargeable battery 15, e.g., from an external power source. In some implementations, charging interface 25 may be configured to support wireless charging of rechargeable battery 15, e.g., from an external power source, including but not limited to induction-based charging. In some implementations, charging interface 25 may be a universal serial bus (USB) port configured to receive an electrical connector for charging rechargeable battery 15. A USB port is merely one type of standardized charging interface. Other standards are contemplated within the scope of this disclosure. The electrical connector may be connected to an external power source. In some implementations, charging interface 25 may be covered for protection and/or other reasons.

Detector 18 may be configured to detect whether mechanical couplings 16 are coupled in a manner operable and suitable for blending by blender 100. In some implementations, operation of detector 18 may use one or more magnetic components. For example, in some implementations, one or more magnetic components are included in container body 20. Engagement may be detected responsive to these one or more magnetic components being aligned and sufficiently close to one or more matching magnetic components that may be included in base assembly 11. In some implementations, blender 100 may include one or more alignment indicators 19, depicted in FIG. 1 as matching triangles, to visually aid the user in aligning base assembly 11 with container assembly 12 in a manner operable and suitable for blending. In some implementations, one or more alignment indicators 19 may be in the front, in the back, and/or in other parts of blender 100.

Control interface 29 is (part of) the user interface of blender 100. Through this user interface, a user of blender 100 may control the operation of blender 100, including but not limited to transitions between different modes of operation, and/or control presentations of visual content on display panel 21. Visual content may be text graphics, image graphics, symbols, logos, and/or other types of visual content capable of being displayed on a screen.

In some implementations, visual content may include one or more volume markers, volume measurements, ingredient markers, and/or other visual content. An individual volume marker may indicate a position along the panel height of display panel 21. The individual volume marker may be at least one of a line, a dash, a dot, and/or other symbols. The individual volume marker may correspond to a volume measurement. The volume measurement may be a numerical value which specifies the volume of foodstuffs that can be held in a portion of container body 20. The portion of the container body may be defined by the position along the panel height of the display panel indicated by the volume marker to a second position along the container height. The second position may be a position near proximal end 5 and/or a position indicated by a second volume marker. The volume measurement may be one or more of an ounce, two ounces, one quarter of a cup, one third of a cup, one half of a cup, three-quarters of a cup, one cup, two cups, three cups, 50 mL, 100 mL, 200 mL, 400 mL, and/or other volumetric values. In some implementations the individual volume marker may be presented on display panel 21 near or next to the corresponding volume measurement. The individual volume marker may correspond to an ingredient marker. The ingredient marker may indicate a type of foodstuff to put into container body 20. The ingredient marker may be a text graphic, an image, and/or other types of visual content capable of being displayed on a screen. In some implementations, the individual volume marker may be presented on display panel 21 near or next to the corresponding ingredient marker. In some implementations, combinations of volume markers, volume measurements, ingredient markers, and/or other types of visual content may correspond to recipes. Recipes may be presented to the user on control interface 29. The user may then select an individual recipe through control interface 29. User selection of the individual recipe may effectuate the presentation of particular visual content on display panel 21 in accordance with the individual recipe.

The different modes of operation may include multiple blending modes of operation. For example, in some implementations, the modes of operation include a ready-to-blend mode. During the ready-to-blend mode, blender 100 is not blending, but blender 100 may be ready to blend (i.e., ready to initiate blending). For example, blender 100 may have sufficient power through rechargeable battery 15, and mechanical couplings 16 may be coupled in a manner operable and suitable for blending by blender 100. The transitions may include transitions from the ready-to-blend mode to one of the blending modes of operation, and/or vice versa. In some implementations, the blending modes of operation of blender 100 may include at least two blending modes of operation: a fixed-time blending mode of operation, a variable-time blending mode of operation, and/or other blending modes of operation. For example, during the fixed-time blending mode of operation of blender 100, control circuitry 17 may be configured to effectuate rotation of blending component 133 (in other words, to effectuate blending) for a particular duration. In some implementations, the particular duration may be limited to a predetermined time limit. For example, the predetermined time limit may be 10 seconds, 20 seconds, 30 seconds, 40 seconds, 50 seconds, 1 minute, and/or other time limit. In some implementations, the predetermined time limit may be between 10 and 60 seconds, between 20 and 50 seconds, between 30 and 40 seconds, between 1 and 2 minutes, and/or have another range of durations. For example, during the variable-time blending mode of operation of blender 100, control circuitry 17 may be configured to effectuate rotation of blending component 133 for one or more durations. Individual ones of the one or more durations may correspond to individual occurrences of the user touching control interface 29 and/or touchscreen 31. In other words, as long as the user continues to touch (or otherwise provide input), blender 100 blends. For example, the user may use short taps or longer taps, or any combination as desired during the variable time blending mode of operation of blender 100.

In some implementations, control interface 29 may include one or more touchscreens, such as touchscreen 31. For example, a touchscreen of control interface 29 may be configured to receive user input. As used herein, user input of a touchscreen may include one or more of tapping touchscreen 31, multiple consecutive occurrences of tapping on touchscreen 31, swiping touchscreen 31 (e.g., horizontally, vertically, and/or diagonally), and/or other user gestures (by way of non-limiting example, a circular swipe or gesture, a pinch a reverse pinch, etc.) or user interactions with touchscreen 31. In some implementations, control interface 29 includes exactly one touchscreen (i.e., touchscreen 31). For example, in some implementations, touchscreen 31 may be the only user-manipulatable portion of control interface 29, such that no other user interface component controls the operation of blender 100, the transitions between different blending modes of operation used by blender 100, or the presentations of visual content on display panel 21.

In some implementations, control interface 29 may include one or more controllable light-emitting components. For example, the light-emitting components may be LEDs or other types of lights. In some implementations, the light emitting components may be positioned around the circumference of control interface 29 and/or touchscreen 31. In some implementations the light emitting component may be (part of) control interface 29 or touchscreen 31. For example, control interface 29 may flash to indicate a transition from one (blending) mode to another (blending) mode. In some implementations, the one or more controllable light-emitting components may be configured to selectively light up. In some implementations, the one or more controllable light-emitting components may be configured to indicate, to a user, a current mode of operation of blender 100, an occurrence of a transition between different modes of operation, a warning for the user, and/or other information regarding the operation of blender 100. For example, the one or more controllable light-emitting components may use different colors, intensities, patterns, sequences, and/or other combinations of light to provide information to the user. In some implementations, control interface 29 may include one or more controllable sound-emitting components, such as a speaker, configured to selectively emit sound. In some implementations, the one or more controllable sound-emitting components may be configured to indicate, to a user, a current mode of operation of blender 100, an occurrence of a transition between different modes of operation, a warning for the user, and/or other information regarding the operation of blender 100. For example, the one or more controllable sound-emitting components may use different frequencies, volumes, patterns, sequences, and/or other combinations of sound to provide information to the user.

In some implementations, base assembly 11 may include a haptic feedback engine (not depicted). The haptic feedback engine may be configured to provide haptic feedback to the user. Haptic feedback to the user may be controlled by control circuitry 17. In some implementations, a detection of user input by control circuitry 17 may initiate one or more haptic feedback responses by the haptic feedback engine. A haptic feedback response may include one or more vibrations of control interface 29 and/or touchscreen 31. In some implementations, the haptic feedback response may be determined by the type of detections made by control circuitry 17. By way of non-limiting example, a first type of detections may initiate a first type of haptic feedback response, and a second type of detections may initiate a second type of haptic feedback response, and/or other haptic feedback responses. The first type of haptic feedback response may be different than the second type of haptic feedback response and/or other haptic feedback responses. In some implementations, haptic feedback response may vary in vibration strength, pattern, and/or other (vibration) aspects. In some implementations, the haptic feedback response may include control interface 29 and/or touchscreen 31 moving inward, similar to a button, upon receiving user input. In some implementations, the haptic feedback responses may be used to convey blender information to the user. For example, a haptic feedback response may indicate to the user that blender 100 is in a low-battery mode and/or in a locked mode.

In some implementations, touchscreen 31 may include on or more of an electronic ink design. In some implementations, the electronic ink design may be embedded into touchscreen 31. In some implementations, the electronic ink design may include one or more of a logo, an icon, and/or other designs. In some implementations, the electronic ink design may only be visible to the user when touchscreen 31 is not illuminated and/or turned off. In some implementations, the electronic ink design may be visible to the user when blender 100 is in one or more of a low-power mode, a locked mode, a ready-to-blend mode, a shutdown mode, and/or other modes.

In some implementations, control interface 29 (e.g., through touchscreen 31) may be configured to present one or more of a home menu, a settings menu, a selection menu, a recipe menu, and/or other menus and/or presentations. The recipe menu may include one or more recipes capable of being selected by the user. Individual recipes included in the recipe menu may correspond to visual content capable of being displayed on display panel 21. Visual content may include first visual content, second visual content, third visual content, and/or other visual content. First visual content may be in accordance with the first recipe, second visual content may be in accordance with the second recipe, third visual content may be in accordance with the third recipe, and so on and so forth.

Control circuitry 17 may be configured to control different functions and/or operations of blender 100, including but not limited to turning blender 100 on and off, transitioning between different modes of operation, charging of rechargeable battery 15, controlling of electrical motor 14 with regard to rotation of blending component 133 and/or during rotation of blending component 133, determining whether mechanical couplings 16 are engaged properly for blending, controlling or otherwise using control interface 29, and/or performing other functions for blender 100. In some implementations, control circuitry 17 may be configured to prevent rotation of blending component 133 responsive to a determination that mechanical couplings 16 are not engaged (or not engaged properly for the intended operation of blender 100). In some implementations, control circuitry 17 may be configured to use control interface 29 to convey information regarding the operational status of blender 100 to a user. For example, control interface 29 may include a light that can illuminate in various colors and/or patterns. In some implementations, control circuitry 17 may be implemented as a printed circuit board (PCB). In some implementations, information regarding the operational status of blender 100 may be conveyed through display panel 21. Display panel 21 may present visual content including warnings, battery level, current blending model of operation, and/or other information. For example, display panel 21 may present visual content indicating that mechanical couplings 16 are not engaged, blender 100 has a low battery level, and/or other information.

In some implementations, control circuitry 17 may be configured to make detections regarding one or more touchscreens of control interface 29 (or regarding control interface 29 itself). For example, control circuitry 17 may be able to detect whether touchscreen 31 has received (one or more types of) user input. User input may include one or more of the user single tapping, double tapping, swiping (horizontally from left to right, horizontally from right to left, vertically from top to bottom, vertically from bottom to top, and/or other types of swiping), tapping and holding, and/or other interactions or types of user input received through control interface 29 and/or touchscreen 31. Control circuitry 17 may be configured to make different types of detections based on user input, including but not limited to first, second, third types of detections, and/or other types of detections. A first type of detection may indicate occurrences of a first type of user input. A second type of detection may indicate occurrence of a second type of user input. A third type of detections may indicate occurrence of a third type of user input, and so forth.

In some implementations, the first type of user input may indicate the user touching control interface 29 and/or touchscreen 31 in a first manner. For example, the user may select the first recipe from the recipe menu displayed on touchscreen 31. In some implementations, the user may select the first recipe by touching, swiping, pinching, and/or other maneuvers at a position on touchscreen 31 where the first recipe is located. Responsive to the user selecting the first recipe, control circuitry 17 may make a first detection of the first type of detections. The first detection of the first type of detections may effectuate presentation of first visual content on display panel 21. First visual content may include one or more volume markers, volume measurements, ingredient markers, and/or other types of visual content in accordance with the first recipe. The user may then select the second recipe from the recipe menu displayed on touchscreen 31. In some implementations, the user may select the second recipe by touching, swiping, pinching, and/or other maneuvers at a position on touchscreen 31 where the second recipe is located. Responsive to the user selecting the second recipe, control circuitry 17 may make a second detection of the first type of detections. The second detection of the first type of detections may effectuate presentation of second visual content on display panel 21. Second visual content may include one or more volume markers, volume measurements, ingredient markers, and/or other types of visual content in accordance with the second recipe.

In some implementations, the second type of user input may indicate the user touching control interface 29 and/or touchscreen 31 in a second manner. Responsive to the user touching (i.e., providing user input) in the second manner, control circuitry 17 may be configured to enable one or more transitions between different (blending) modes of operation. The transitions may include a first, second, third, fourth, fifth transition and so forth. For example, the first transition may be from a ready-to-blend mode to a first blending mode. In some implementations, a transition to the first blending mode may occur responsive to a third detection of the second type of detections. The first blending mode may be one of a fixed-time blending mode, a variable time blending mode, and/or other blending modes. For example, the second transition may be from a first blending mode to a ready-to-blend mode. In some implementations, the second transition may occur responsive to a fourth detection of the second type of detections and/or other particular types of detections. Other particular types of detections may include one or more idle durations in which control interface 29 and/or touchscreen 31 does not receive user input for a set duration of time. By way of non-limiting example, the first blending mode may have a fixed time duration, after which the blender may automatically "time-out" and transition to the ready-to-blend mode without user input. For example, the third transition may be from a first blending mode to a second blending mode. The second blending mode may be a different blending mode of operation than the first blending mode. In some implementations, the third transition may occur responsive to a fifth detection of the second type of detections. In some implementations, control circuitry 17 may be configured to prevent rotation of blending component 133 in a locked mode of operation. In some implementations, control circuitry 17 may be configured to allow rotation of blending component 133 in an unlocked mode of operation (by way of non-limiting example, the ready-to-blend mode may be an unlocked mode of operation).

In some implementations, the third type of user input may indicate the user touching control interface 29 and/or touchscreen 31 in a third manner. Responsive to the user touching in the third manner, control circuitry 17 may be configured to control operations of control interface 29 to enable one or more transitions between displays presented via touchscreen 31 or another component of blender 100 (e.g., different sets of information and/or different options for accepting user input). Displays may include one or more of a home menu, a settings menu, a selection menu, a recipe menu, and/or other menus and/or presentations.

Figure 5:
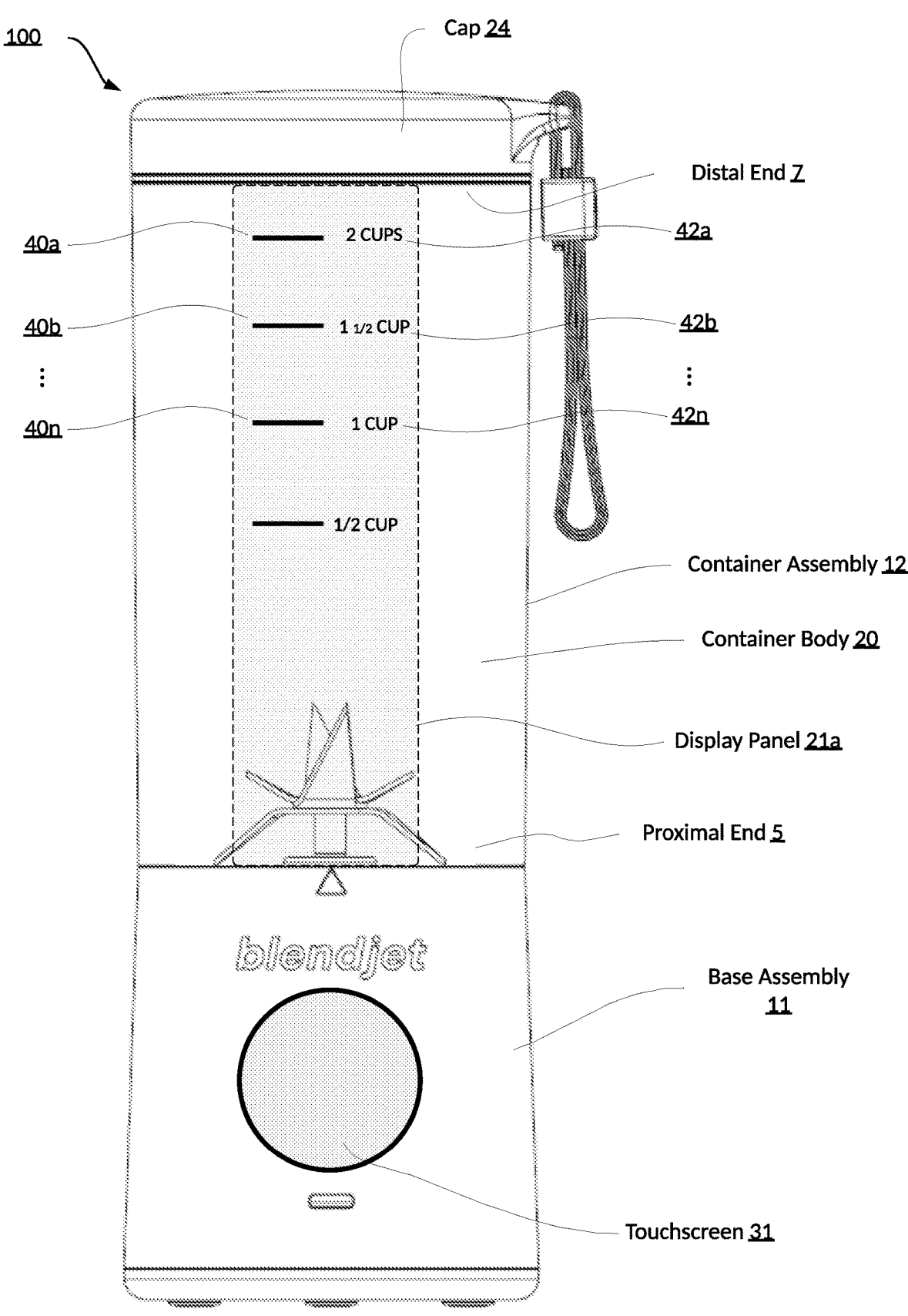
FIG. 5 shows an exemplary use of a blender with a transparent display panel, in accordance with one or more implementations.

FIG. 5 illustrates an exemplary use of a blender 100 with a transparent display panel 21a (blender 100 and display panel 21a may be the same as or similar to the blender and display panel shown in FIG. 1). Display panel 21a may be configured to present particular visual content. The visual content may include one or more volume markers 40a-n, one or more volume measurements 42a-n, and/or other components. In some implementations, visual content presented on display panel 21a may be used for measuring foodstuffs to be held in or added to container body 20. In some implementations, visual content may include pairs of volume markers and volume measurements. For example, volume marker 40a may be paired with volume measurement 42a, volume marker 40b may be paired with volume measurement 42b, and so on and so forth.

Referring to FIG. 5, volume marker 40a may indicate a position along the container height. A first portion of container body 20 may extend from proximal end 5 to the position indicated by volume marker 40a. The first portion of container body 20 may be capable of holding a volume that is specified by volume measurement 42a (1.5 cups). In some implementations, volume marker 40b may indicate a position along the container height. A second portion of container body 20 may extend from proximal end 5 to the position indicated by volume marker 40b. The second portion of container body 20 may be capable of holding a volume that is specified by volume measurement 42b (1.25 cups). In some implementations, volume markers 40a-n and/or volume measurement 42a-n may include different units of measurement, may include more or less volume markers and/or volume measurement, and/or other variations. In some implementations, changes to the visual content presented on display panel 21a may be effectuate by user interaction with touchscreen 31.

Figure 6:
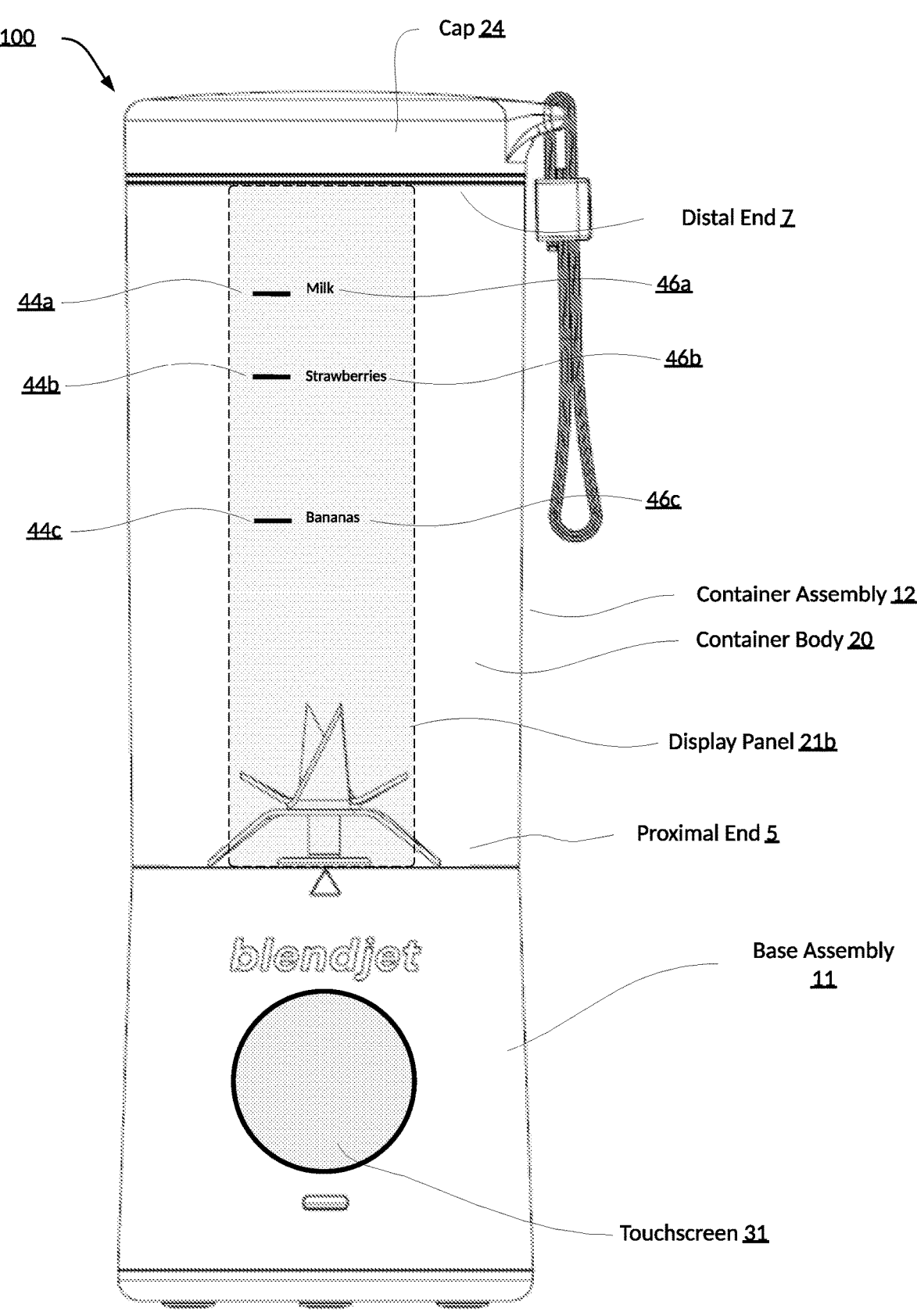
FIG. 6 shows an exemplary use of a blender with a transparent display panel, in accordance with one or more implementations.

FIG. 6 illustrates an exemplary use of a blender 100 with a transparent display panel 21b (blender 100 and display panel 21b may be the same as or similar to the blender and display panel shown in FIG. 1). FIG. 6 may show blender 100 at a time after control circuitry 17 has made a detection of the first type of detections and/or the user has selected the first recipe from the recipe menu via touchscreen 31. Display panel 21b may be configured to present visual content. Although display panel 21 is shown as extending from proximal end 5 to distal end 7, this is not meant to be limiting. Display panel 21 may extend from a first point along the container height to a second point along the container height.

Referring to FIG. 6, visual content may include volume markers 44*a-c*, ingredient markers 46*a-c*, and/or other components. Volume markers 44*a-c*, ingredient markers 46*a-c* and/or other components may be presented in accordance with the first recipe. In some implementations, selection of different recipes may effectuate presentation of different visual content. In some implementations, visual content may include pairs of volume markers and ingredient markers. For example, volume marker 44*a* may be paired with ingredient marker 46*a*, volume marker 44*b* may be paired with ingredient marker 46*b*, and volume marker 44*c* may be paired with ingredient marker 46*bc*. Volume marker 44*c* may indicate a fill level for a first ingredient specified by ingredient marker 46*c*. Volume marker 44*b* may indicate a fill level for a second ingredient specified by ingredient marker 46*b*. Volume marker 44*a* may indicate a fill level for a third ingredient specified by ingredient marker 46*a*. In some implementations, ingredients may be placed into container body in an order specified by the visual content. For example, the first recipe may require the user to place the ingredients in the order that they are present from proximal end 5 to distal end 7.

FIG. 2 illustrates a method 200 for effectuating presentations of visual content on a display panel of a blender, in accordance with one or more implementations. The blender may include a base assembly, a container assembly including the display panel, the container assembly having a container height, a blending component, a control interface including a touchscreen, and control circuitry. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, control circuitry, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a first type of user input through the control interface. The first type of user input may indicate a user touching the control interface and/or a touchscreen in a first manner. In some embodiments, operation 202 is performed by a touchscreen and/or a control interface the same as or similar to touchscreen 31 and/or control interface 29 (shown in FIG. 1 and described herein).

An operation 204 may include making detections regarding the user input received through the control interface. The detections may include a first type of detections. The first type of detections may indicate occurrences of the control interface receiving the first type of user input. In some embodiments, operation 204 is performed by control circuitry the same as or similar to control circuitry 17 (shown in FIG. 1 and described herein).

An operation 206 may include, responsive to a first detection of the first type of detections, effectuating presentation of first visual content on the display panel. The display panel has a panel height extending along at least 50% of the container height. In some embodiments, operation 206 is performed by control circuitry the same as or similar to display panel 21 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A blender configured to blend foodstuffs, the blender comprising:
   a blending component configured to rotate around a rotational axis and blend the foodstuffs during blending by the blender;
   an electrical motor configured to provide a rotational force to the blending component;
   a control interface configured to receive user input from a user;
   a container assembly including a container body having a container height and a display panel having a display panel height, wherein the container assembly is configured to hold the foodstuffs within the container body, wherein the display panel is embedded in the container assembly, and wherein the display panel is configured to electronically present visual content, wherein the visual content includes first visual content and second visual content; and
   control circuitry configured to:
      control the electrical motor during blending by the blender;
      responsive to a first user input received by the control interface, effectuate presentation of the first visual content on the display panel; and
      responsive to a second user input received by the control interface, effectuate presentation of the second visual content on the display panel, wherein the second visual content is different from the first visual content.

2. The blender of claim 1, further including a drive shaft, wherein the drive shaft has a proximal end and a distal end, wherein the blending component is carried at or near the distal end of the drive shaft, and wherein the drive shaft is coupled with the electrical motor at or near the proximal end of the drive shaft.

3. The blender of claim 1, wherein the display panel height is at least 40% of the container height.

4. The blender of claim 1, wherein the control interface includes a touchscreen configured to receive the user input from the user.

5. The blender of claim 4, wherein the touchscreen is round, and wherein the touchscreen is configured to present one or more of a home menu, a recipe menu, and/or a settings menu.

6. The blender of claim 4, wherein the user input includes at least one of:

(i) tapping the touchscreen once, (ii) multiple consecutive occurrences of tapping the touchscreen, and/or (iii) swiping the touchscreen.

7. The blender of claim 4, wherein the touchscreen is configured to present user-selectable options that affect operations of the blender.

8. The blender of claim 1, wherein the display panel is a transparent screen, such that the foodstuffs held in the container assembly are visible through the display panel during the presentation of the first visual content.

9. The blender of claim 8, wherein the transparent screen is one or more of an LCD screen, an LED screen, and/or an OLED screen.

10. The blender of claim 1, wherein the first visual content includes at least one of volume markers, volume measurements, and/or ingredient markers.

11. The blender of claim 10, wherein the ingredient markers indicate a type of foodstuff to put into the container body.

12. The blender of claim 1, wherein a volume marker indicates a position along the display panel height of the display panel, and wherein the volume marker is at least one of a line, a dash, a dot, and/or a symbol.

13. The blender of claim 1, wherein a volume measurement corresponds to a volume marker, wherein the volume measurement indicates a volume of foodstuffs that can be held in a portion of the container body from a proximal end of the container body to a position along the display panel height of the display panel that is indicated by the volume marker.

14. The blender of claim 1, wherein the first visual content includes first text graphics that correspond to a first recipe, and wherein the second visual content includes second text graphics that correspond to a second recipe.

15. The blender of claim 14, wherein the first user input effectuates selecting the first recipe, and wherein the first visual content includes one or more of:

(i) one or more volume markers, (ii) one or more volume measurements, and/or (iii) one or more ingredient markers, in accordance with the first recipe.

16. A method for effectuating presentations of visual content on a display panel of a blender that blends foodstuffs, the display panel having a display panel height, wherein the blender includes a container body to hold the foodstuffs, a blending component that rotates around a rotational axis to blend the foodstuffs held in the container body, an electrical motor that provides a rotational force to the blending component, wherein the container body has a container height, and wherein the display panel is embedded in the container body, the method comprising:

receiving a first user input through a control interface of the blender;

responsive to receiving the first user input via the control interface, effectuating presentation of a first visual content on the display panel;

receiving a second user input through the control interface; and responsive to receiving the second user input via the control interface, effectuating presentation of a second visual content on the display panel.

17. The method of claim 16, wherein the display panel is a transparent screen, such that the foodstuffs held in the container body are visible through the display panel during the presentation of the first and second visual content.

18. The method of claim 16, wherein the first visual content includes at least one of volume markers, volume measurements, and/or ingredient markers.

19. The method of claim 16, wherein the first visual content includes first text graphics that correspond to a first recipe, and wherein the second visual content includes second text graphics that correspond to a second recipe.

20. The method of claim 16, further comprising:

presenting, via the control interface, one or more of a home menu, a recipe menu, and/or a settings menu, wherein the settings menu depicts user-selectable options that affect operations of the blender.

\*   \*   \*   \*   \*